United States Patent
Cadotte, Jr. et al.

(10) Patent No.: US 11,065,612 B2
(45) Date of Patent: Jul. 20, 2021

(54) UNITARY SEROLOGICAL PIPETTE AND METHODS OF PRODUCING THE SAME

(71) Applicant: Corning Incorporated, Corning, NY (US)

(72) Inventors: John Claude Cadotte, Jr., Waterboro, ME (US); Gregory Roger Martin, Acton, ME (US); Michael Kurt Schaefer, Gorham, ME (US); James Mark Seymour, Portland, ME (US)

(73) Assignee: Corning Incorporated, Corning, NY (US)

( * ) Notice: Subject to any disclaimer, the term of this patent is extended or adjusted under 35 U.S.C. 154(b) by 497 days.

(21) Appl. No.: 15/986,323

(22) Filed: May 22, 2018

(65) Prior Publication Data

US 2018/0264460 A1  Sep. 20, 2018

Related U.S. Application Data

(63) Continuation of application No. PCT/US2016/063248, filed on Nov. 22, 2016.
(Continued)

(51) Int. Cl.
   *B01L 3/02*  (2006.01)
   *B29C 49/04* (2006.01)
   (Continued)

(52) U.S. Cl.
   CPC ........... *B01L 3/021* (2013.01); *B01L 2200/12* (2013.01); *B01L 2300/0681* (2013.01);
   (Continued)

(58) Field of Classification Search
   CPC .................... B01L 3/021; B29C 2049/4869
   See application file for complete search history.

(56) References Cited

U.S. PATENT DOCUMENTS 2,595,493 A   5/1952   Slaby et al.
2,697,945 A   12/1954  Dovas
             (Continued)

FOREIGN PATENT DOCUMENTS

BE      752032 A1    12/1970
CN   102847566 A  *   1/2013
             (Continued)

OTHER PUBLICATIONS

Hartig, T., et al., "In-Mold Surface Modification and In-Mold Printing During Injection Molding." 27th PPS Annual Meeting, Marrakech, Morocco,1 Page, May 11, 2011.
(Continued)

*Primary Examiner* — Jacob T Minskey
*Assistant Examiner* — Virak Nguon
(74) *Attorney, Agent, or Firm* — F. Brock Riggs

(57) ABSTRACT

A pipette may comprise a length, a longitudinal axis, and an inner curved surface enclosing a space. The pipette may have a tip region having a tip thickness. The tip region may be connected to a body region having a body thickness. The tip thickness may be greater than the body thickness. The body region may be connected to a mouth region having a mouth thickness. The mouth thickness may be greater than the body thickness. The inner curved surface may not contain bumps or ridges either between the tip region and the body region or between the body region and the mouth region. The pipette may be formed by blow molding or vacuum forming.

26 Claims, 10 Drawing Sheets

Related U.S. Application Data

(60) Provisional application No. 62/404,677, filed on Oct. 5, 2016, provisional application No. 62/327,823, filed on Apr. 26, 2016, provisional application No. 62/259,811, filed on Nov. 25, 2015.

(51) Int. Cl.
*B29K 23/00* (2006.01)
*B29D 23/00* (2006.01)
*B29K 25/00* (2006.01)

(52) U.S. Cl.
CPC ............... *B01L 2300/0838* (2013.01); *B01L 2300/0858* (2013.01); *B01L 2300/12* (2013.01); *B01L 2300/16* (2013.01); *B29C 49/04* (2013.01); *B29D 23/001* (2013.01); *B29K 2023/12* (2013.01); *B29K 2025/06* (2013.01)

(56) References Cited

U.S. PATENT DOCUMENTS

| | | | |
|---|---|---|---|
| 3,084,592 A | 4/1963 | Scott | |
| 3,258,972 A | 7/1966 | Cassaday et al. | |
| 3,394,209 A * | 7/1968 | Cheney | B29C 48/0017 264/527 |
| 3,457,590 A | 7/1969 | Dittmann | |
| 3,718,133 A | 2/1973 | Perry et al. | |
| 3,781,395 A | 12/1973 | Uhlig | |
| 3,834,241 A | 9/1974 | Garren | |
| RE31,555 E * | 4/1984 | Garren | B01L 3/021 222/209 |
| 4,779,768 A | 10/1988 | St. Amand | |
| 5,073,347 A | 12/1991 | Garren et al. | |
| 5,125,278 A | 6/1992 | Foldenauer | |
| 5,563,356 A | 10/1996 | Mussi et al. | |
| 5,773,305 A | 6/1998 | Zabetakis et al. | |
| 5,962,096 A * | 10/1999 | Smith | B05B 11/3046 428/35.7 |
| 6,343,717 B1 | 2/2002 | Zhang et al. | |
| 6,837,119 B2 | 1/2005 | Blackwood-Sewell | |
| 6,896,005 B2 | 5/2005 | Noone et al. | |
| 8,003,041 B2 | 8/2011 | Borchert et al. | |
| 8,113,067 B2 | 2/2012 | Tanner | |
| 2002/0113341 A1 * | 8/2002 | Ogawa | B29C 49/50 264/540 |
| 2002/0180115 A1 | 12/2002 | Weeks | |
| 2008/0171163 A1 * | 7/2008 | Caviezel | B29C 49/4242 428/35.7 |
| 2009/0158861 A1 * | 6/2009 | Tanner | B29C 65/00 73/864.11 |
| 2010/0248370 A1 | 9/2010 | Moynahan | |
| 2012/0009103 A1 | 1/2012 | Liu | |
| 2012/0018928 A1 * | 1/2012 | Ramrakhyani | B29C 49/4817 264/527 |
| 2012/0096957 A1 | 4/2012 | Ochman | |
| 2014/0260697 A1 * | 9/2014 | Staton | B01L 3/0275 73/864.01 |
| 2015/0367109 A1 * | 12/2015 | Maeda | B29C 49/22 604/103.06 |
| 2016/0052187 A1 * | 2/2016 | Werner | B29C 49/4802 264/537 |
| 2016/0318014 A1 | 11/2016 | Tubbs et al. | |
| 2017/0036203 A1 * | 2/2017 | Le | B01L 3/021 |

FOREIGN PATENT DOCUMENTS

| | | |
|---|---|---|
| FR | 1304124 A | 9/1962 |
| GB | 1169954 A | 11/1969 |
| JP | 51-135593 A | 11/1976 |
| JP | 05-042944 A | 2/1993 |
| JP | 2006-168355 A | 6/2006 |
| WO | 2014147206 A2 | 9/2014 |
| WO | 2015011003 A1 | 1/2015 |

OTHER PUBLICATIONS

International Search Report and Written Opinion of the International Searching Authority; PCT/US2016/063248 dated Feb. 1, 2017; 12 Pages; European Patent Office.

Japanese Patent Application No. 2018-526847 Office Action dated Oct. 7, 2020; 8 Pages; Japanese Patent Office.

Chinese Patent Application No. 201680069095.X Second Office Action dated Oct. 16, 2020; 7 pages; Chinese Patent Office.

* cited by examiner

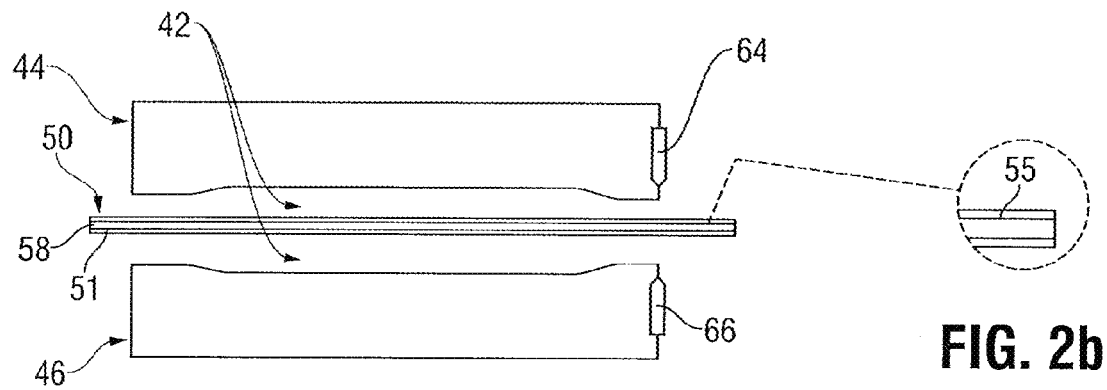
FIG. 2a
FIG. 2b
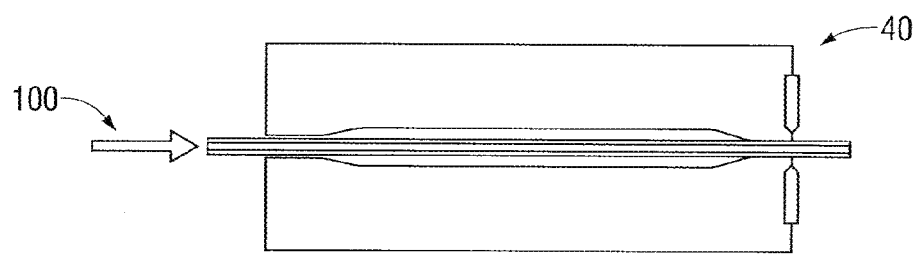
FIG. 2c
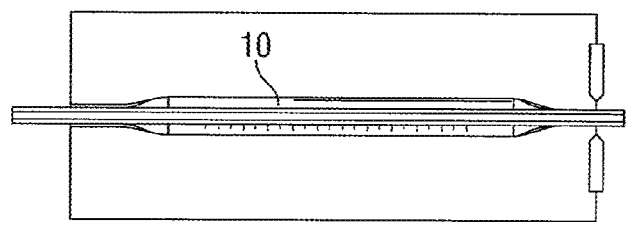
FIG. 2d

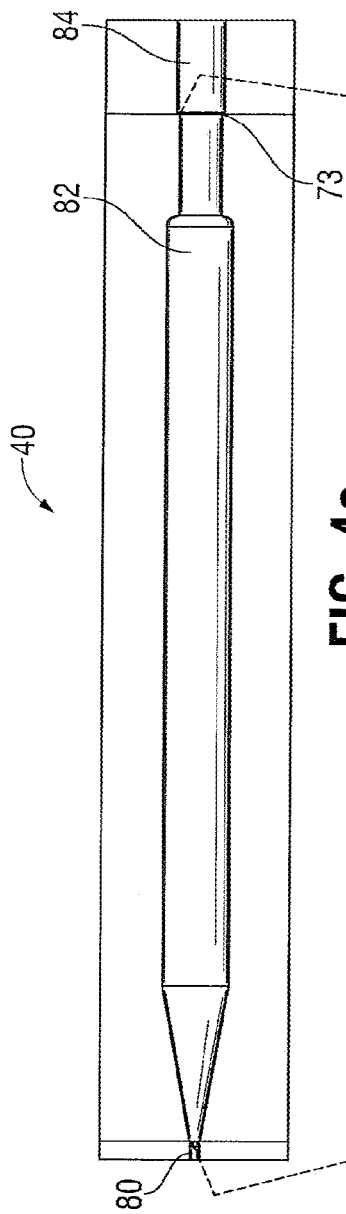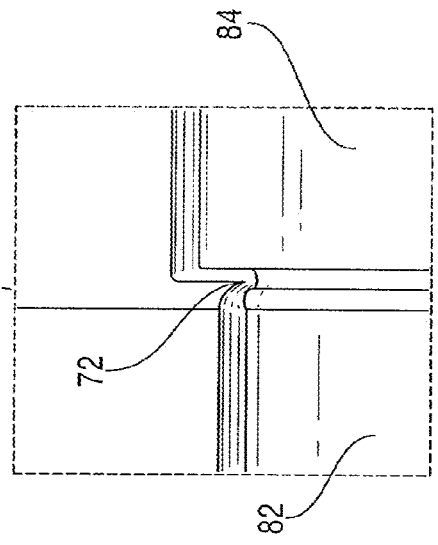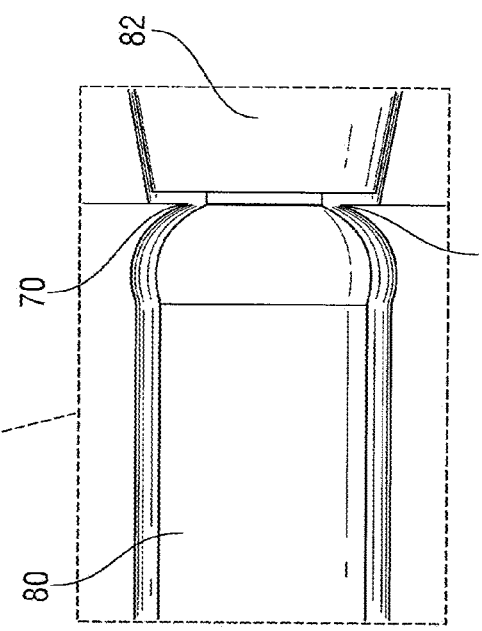

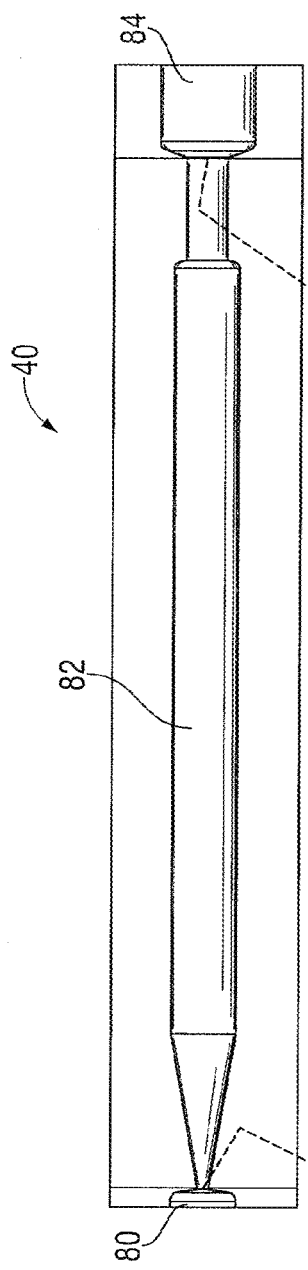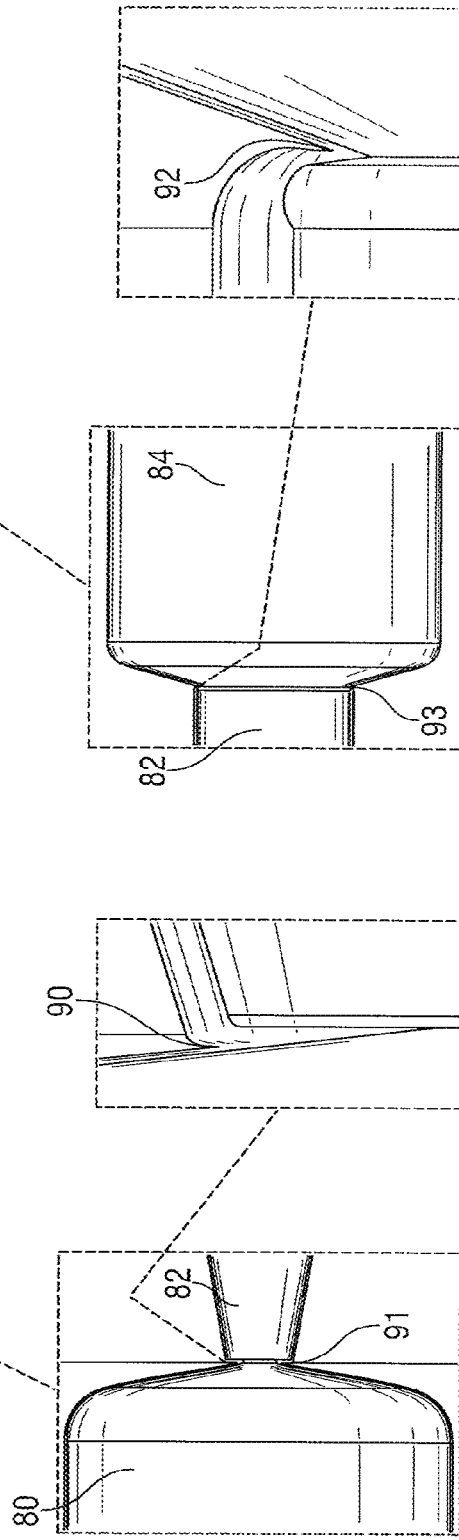

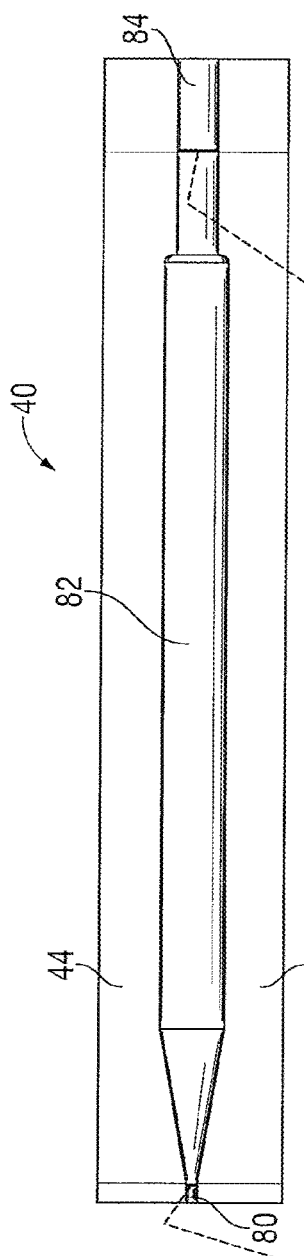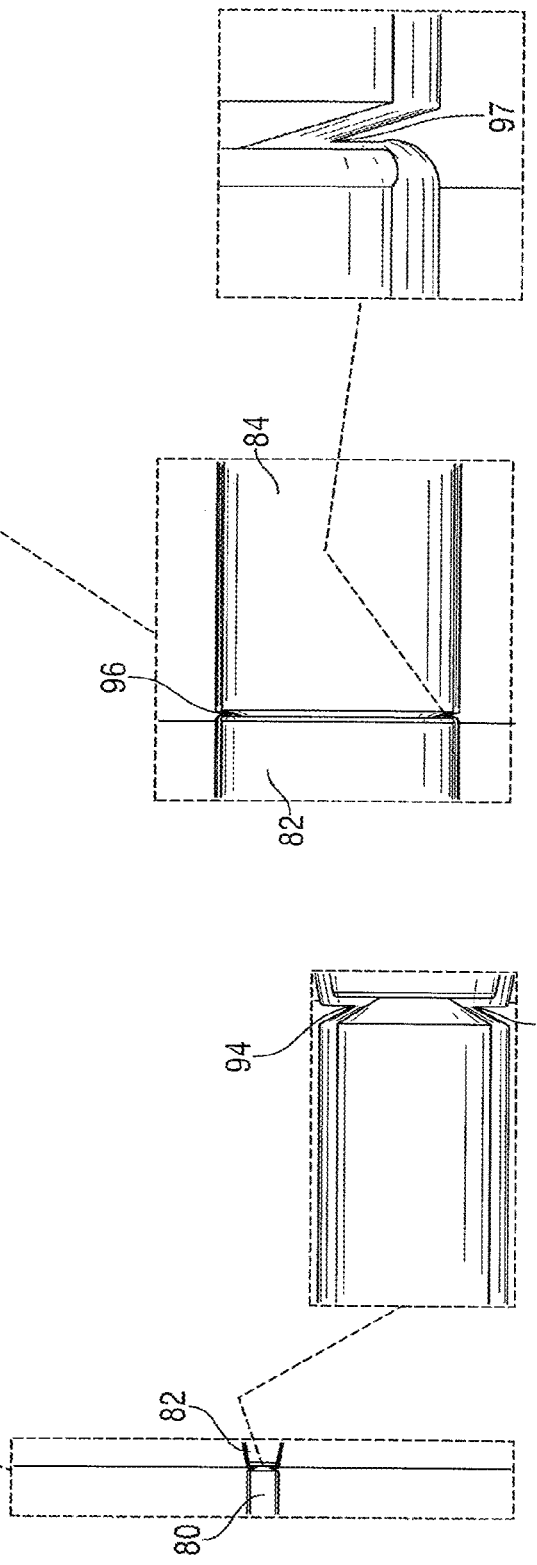
FIG. 6a
FIG. 6b
FIG. 6c
FIG. 6d
FIG. 6e

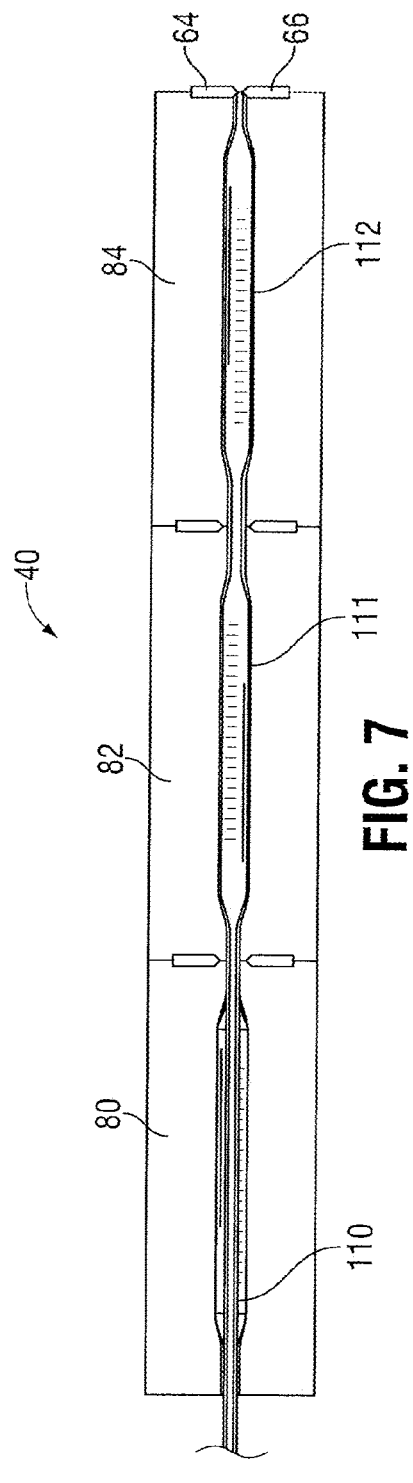
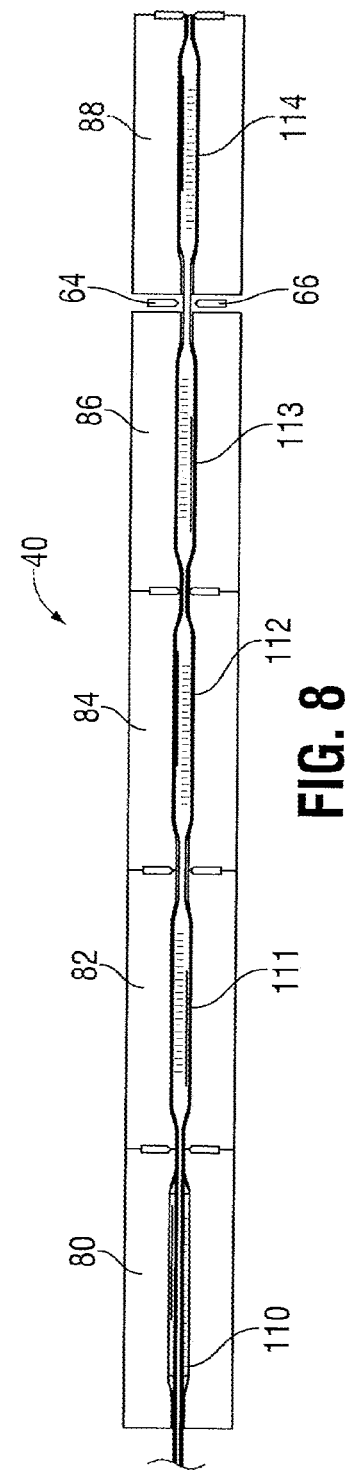

UNITARY SEROLOGICAL PIPETTE AND METHODS OF PRODUCING THE SAME

CROSS-REFERENCE TO RELATED APPLICATIONS

This application is a continuation of International Patent Application Serial No. PCT/US2016/063248 filed on Nov. 22, 2016, which claims the benefit of priority of U.S. Provisional Application Ser. No. 62/259,811 filed on Nov. 25, 2015, U.S. Provisional Application Ser. No. 62/327,823 filed on Apr. 26, 2016, and U.S. Provisional Application Ser. No. 62/404,677 filed on Oct. 5, 2016, the content of which is relied upon and incorporated herein by reference in its entirety.

FIELD

The present disclosure generally relates to unitary serological pipettes and methods of forming the same by, for example, blow molding or vacuum forming.

BACKGROUND

Currently, unitary serological pipettes are made either by (A) welding mouthpiece and tip pipette components onto a hollow tube or (B) reheating a thick-walled hollow tube and drawing down and trimming the pipette on one or both ends to form a mouthpiece and tip. Each of these methods has certain disadvantages in part cost, material waste, quality, or performance.

SUMMARY

Optionally, a pipette may comprise a length, a longitudinal axis, and an inner curved surface enclosing a space. The pipette may further comprise a tip region having a first diameter and a first thickness. The tip region may be connected to a body region having a second diameter and a second thickness. The second diameter may be greater than the first diameter. The body region may be connected to a mouth region having a third diameter and a third thickness. The second diameter may be greater than the third diameter. The second thickness may be less than either the first thickness or the third thickness. The inner curved surface may not contain bumps or ridges either between the tip region and the body region or between the body region and the mouth region.

Optionally, a method for producing a pipette may comprise the steps of providing a parison, inserting the parison into a mold, and blow-molding or vacuum forming the parison to form a pipette in the shape of the mold. A parison is a hot preform, such as an extruded form in a tube shape. The parison may be hot as it exits an extrusion step and this hot part can be placed directly into a mold. In embodiments, a cold pre-form can be also be used. The parison may have a longitudinal axis and an inner curved surface enclosing a space. The mold may have a mold cavity and proximal and distal mold end features. The pipette may have proximal and distal ends.

Optionally, a method for producing pipettes may comprise the steps of: providing a parison, inserting the parison into a mold having at least two mold cavities, and blow-molding or vacuum forming the parison to form at least two pipettes in the shape of the at least two mold cavities. The parison may have a longitudinal axis and an inner curved surface enclosing a space. Each mold cavity may have proximal and distal mold end features. Each of the at least two pipettes may have proximal and distal ends.

Additional features and advantages of the present disclosure will be set forth in the detailed description which follows, and in part will be apparent to those skilled in the art after reading and understanding the detailed description or recognized by practicing the embodiments described herein, including the detailed description which follows, the claims, and the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF SEVERAL VIEWS OF THE DRAWINGS

The following is a description of the figures in the accompanying drawings. The figures are not necessarily to scale, and certain features and certain views of the figures may be shown exaggerated in scale or in schematic in the interest of clarity or conciseness.

FIGS. 2a-2d illustrate an example method of forming a unitary serological pipette by blow molding according to the present disclosure.

FIGS. 4a-4c illustrate an example mold comprising a mold in-score feature according to the present disclosure.

FIGS. 5a-5e illustrate an example mold comprising a mold in-cut feature according to the present disclosure.

FIGS. 6a-6e illustrate an example mold comprising an alternative mold in-cut feature according to the present disclosure.

FIG. 7 illustrates an example of a series of three unitary serological pipettes being formed according to the present disclosure.

FIG. 8 illustrates an example of a series of five unitary serological pipettes being formed according to the present disclosure.

Figure 1A:
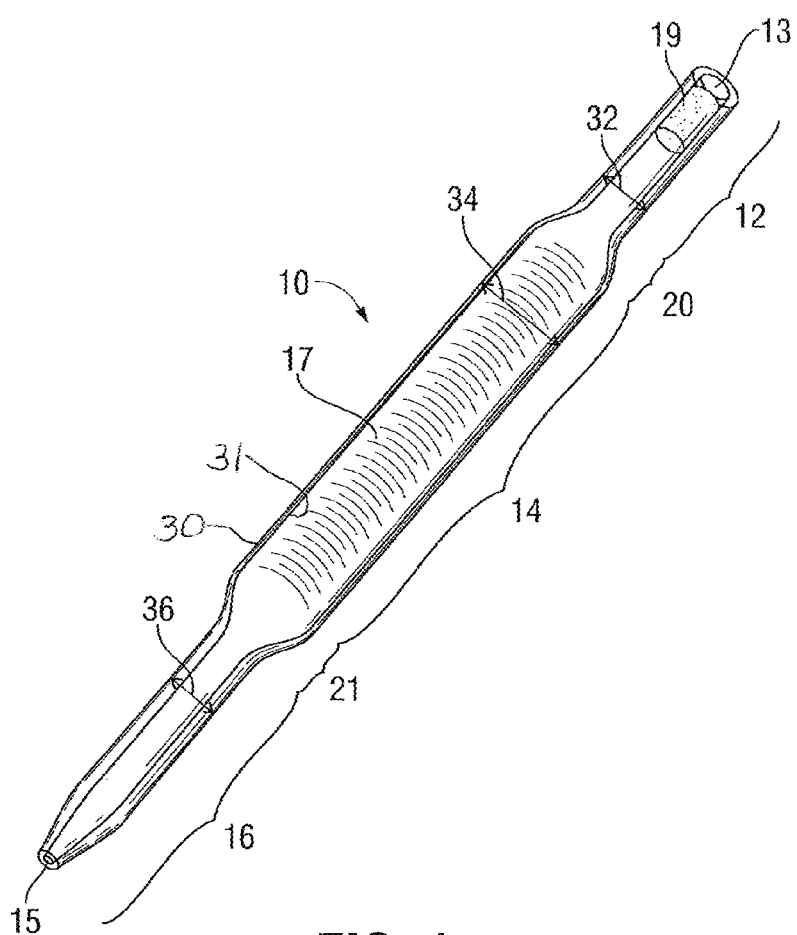
FIGS. 1a-1d illustrates an example of a unitary serological pipette according to the present disclosure.

The following reference characters are used in this specification:
10 Pipette
11 Inner curved surface
12 Mouth region
13 Mouth 14 Body region
15 Tip
16 Tip region
17 Volumetric markings
18 Space
19 Filter
20 Mouth-body transition region
21 Body-tip transition region
Mouth thickness
22 Body thickness
24 Tip thickness
26 Outside surface
30 Inside surface
31 Mouth diameter
34 Body diameter
36 Tip diameter
40 Mold
42 Mold cavity
44 Mold half
46 Mold half
48 Vacuum cavity
50 Parison
51 Inner curved surface
55 Parison thickness
58 Space
64 Mold end feature
66 Mold end feature
70 In-score feature
71 In-score feature
72 In-score feature
73 In-score feature
80 Mold cavity
82 Mold cavity
84 Mold cavity
86 Mold cavity
88 Mold cavity
90 In-cut feature
91 In-cut feature
92 In-cut feature
93 In-cut feature
94 In-cut feature
95 In-cut feature
96 In-cut feature
97 In-cut feature
100 Compressed air
110 Pipette
111 Pipette
112 Pipette
113 Pipette
114 Pipette
120 Mold assembly
122 Mold assembly segment
130 Extruder output
184 Separation Cavity
186 Separation Cavity
194 Pinch feature
196 Pinch feature The foregoing summary, as well as the following detailed description, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

In the following detailed description, numerous specific details are set forth in order to provide a thorough understanding of the present invention. However, it will be clear to one skilled in the art when the present invention can be practiced without some or all of these specific details. In other instances, well-known features or processes may not be described in detail so as not to unnecessarily obscure the invention. In addition, like or identical reference numerals may be used to identify common or similar elements.

The present disclosure relates to unitary serological pipettes. According to aspects of the present disclosure, unitary serological pipettes may be manufactured with improved product reliability and functional performance. Further, the presently disclosed manufacturing methods may reduce the cost and material waste and increase the speed of production of unitary serological pipettes.

Figure 1B:
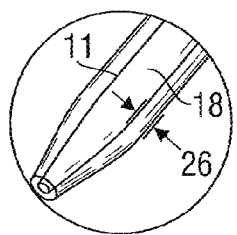
Figure 1C:
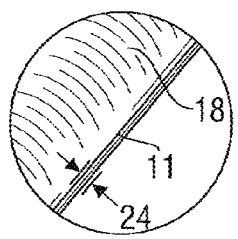
Figure 1D:
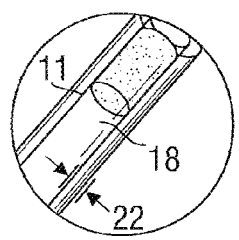

According to an aspect of the present disclosure, FIGS. 1a-1d illustrate an example pipette 10 according to the present disclosure, which may be formed according to the methods disclosed in the present disclosure. As shown in FIGS. 1b (showing the tip region 16), 1c (showing the body region 14) and 1d (showing the mouth region 12), the pipette 10 may comprise an inner curved surface 11 that encloses a space 18. The pipette 10 may comprise a longitudinal axis. The pipette 10 may comprise a mouth 13 and a tip 15. The pipette may comprise a filter 19. The pipette 10 may comprise a series of volumetric markings 17 to indicate a current volume of a liquid stored within the pipette 10. The pipette 10 may be suitably sized to hold a particular volume of liquid, e.g., 1 mL, 2 mL, 5 mL, 10 mL, 25 mL, 50 mL, or 100 mL. The pipette 10 may be manufactured from any suitable material, including polymers such as polystyrene and polypropylene, and glass. The pipette 10 may have a mouth region 12, a body region 14, and a tip region 16, portions of each of which are shown in enlarged views in FIGS. 1b-1d. Each region may have a corresponding wall thickness—a mouth thickness 22, a body thickness 24, and a tip thickness 26—and a corresponding diameter—a mouth diameter 32, a body diameter 34, and a tip diameter 36. The pipette 10 may have a mouth-body transition region 20 between the mouth region 12 and the body region 14. The pipette 10 may have a body-tip transition region 21 between the body region 14 and the tip region 16.

The mouth, body, and tip diameters 32, 34, 36 may each be measured externally. Optionally, the mouth thickness 22, the tip thickness 26, or both the mouth thickness 22 and the tip thickness 26 may be similar to the body thickness 24. For example, the mouth thickness 22, tip thickness 26, and body thickness 24 may each be between 0.4 mm and 1.5 mm, or between 0.6 mm and 1.0 mm, or 0.75 mm. Optionally, the mouth thickness 22, tip thickness 26, or both the mouth thickness 22 and the tip thickness 26 may be thicker than the body thickness 24. For example, the mouth thickness 22 and tip thickness 26 may each be between 0.3 mm and 2.5 mm, or between 0.5 mm and 1.0 mm, or 0.75 mm. For example, the body thickness 24 may be less than 0.6 mm, or less than 0.4 mm, or approximately 0.25 mm. The diameters 32, 34, 36 may each be measured between opposing points on an outer surface of the pipette 10. The body diameter 34 may be greater than either the mouth diameter 32 or the tip diameter 36. For example, the body diameter 34 may be between 4.0 mm and 25.0 mm. The specific body diameter 34 may depend on the volume of liquid the pipette 10 is sized to hold. Depending on the volume, the body diameter 34 may be between 4.0 mm and 5.0 mm, or approximately 4.5 mm; or between 6.0 mm and 7.0 mm, or approximately 6.5 mm; or between 7.5 mm and 8.5 mm, or approximately 8.0 mm; or between 9.0 mm and 10.0 mm, or approximately 9.5 mm; or between 14.0 mm and 15.0 mm, or approximately 14.5 mm; or between 17.5 and 18.5 mm, or approximately 18.0 mm; or between 24.0 mm and 25.0 mm, or approximately 24.5 mm. Example body diameters, body thicknesses, and tip thicknesses corresponding to different pipette volumes of blow-molded pipettes are shown in Table I below.

TABLE I

| Pipette Volume (mL) | Body outer Diameter (mm) | Body Thickness (mm) | Tip Inner Diameter (mm) | Tip Thickness (mm) | Mouth outer Diameter (mm) | Mouth Thickness (mm) |
| --- | --- | --- | --- | --- | --- | --- |
| 1   | 3.5-5.0    | 0.25-0.7  | 1.5-5.0 | 0.3-1.3 | 3.5-5.0 | 0.3-1.3 |
| 2   | 4.5.0-7.0  | 0.25-0.7  | 1.5-7   | 0.3-1.3 | 4.5-7.0 | 0.3-1.3 |
| 5   | 6.0-8.5    | 0.25-0.70 | 1.0-3.0 | 0.3-1.3 | 6.0-8.5 | 0.3-1.3 |
| 10  | 8..0-10.0  | 0.25-0.70 | 1.0-5   | 0.3-1.3 | 7.0-8.5 | 0.3-1.3 |
| 25  | 13.0-15.0  | 0.25-0.70 | 1.0-4.0 | 0.3-2.5 | 7.0-8.5 | 0.5-2.5 |
| 50  | 16.0-18.5  | 0.25-0.70 | 1.0-4.0 | 0.3-2.5 | 7.0-8.5 | 0.5-2.5 |
| 100 | 22.5.0-25.0 | 0.25-0.70 | 1.0-4.0 | 0.3-2.5 | 7.0-8.5 | 0.5-2.5 |

The enhanced thickness in the mouth and tip regions 12, 16 may provide certain advantages during use—e.g., the mouth and tip regions 12, 16 may be harder to damage or break than they would be if they were thinner. In addition, when packaged in sterile packaging, the thicker mouth and/or tip regions 12, 16 are less likely to break the sterile packaging, which may reduce the risk of contamination prior to use. The particular mouth, body, and tip thicknesses 12, 14, 16 may be created as a result of using blow molding or vacuum forming to produce the pipette 10.

Optionally, the pipette 10 may have no bumps or ridges in the mouth-body transition region 20 between the mouth region 12 and the body region 14 or in the body-tip transition region 21 between the body region 14 and the tip region 16, either in the inside surface 31 of the pipette or the outside surface 30 of the pipette. The transition regions 20, 21 that lack bumps or ridges may be referred to as substantially smooth transition regions. The lack of bumps or ridges in the substantially smooth transition regions 20, 21 may be as a result of using blow molding or vacuum forming to produce the pipette 10 as a single piece, instead of forming one or more of the regions 12, 14, 16 separately and then subsequently joining the regions 12, 14, 16 (e.g., by welding, which may produce weld seams). The substantially smooth inside surface 31 in transition regions 20, 21 may reduce particulate and fluid retention that could otherwise accumulate around bumps or ridges in such regions. For at least this region, the substantially smooth transition regions 20, 21 may improve performance of the pipette 10, for example enhancing the accuracy of the volumetric markings 17. For example, when a pipette is assembled, by first drawing or forming a pipette body and then attaching a tip region or mouth region or both, there will be a seam or a mismatch or a step or a bump or a ridge in the internal or external surface of the pipette where this connection is made. In addition, there may be residue or particulate created during the assembly process (ultrasonic welding, for example) which may create unwanted contaminants inside the pipette.

According to another aspect of the present disclosure, FIGS. 2a-2d illustrate an example method for producing a pipette 10 using blow molding. A parison 50 (or a tube or preform) may be inserted into a mold 40. Typically, the parison 50 will be in the shape of a hollow cylinder. Optionally, the parison 50 could be a hollow hexagonally-walled prism, or another shape. The parison 50 may comprise an inner curved surface 51 that encloses a space 58. As shown in FIG. 2b, the parison 50 may have a parison thickness 55. The parison 50 may be manufactured from any suitable material, including polymers such as polystyrene and polypropylene, and glass. The parison 50 may be manufactured, for example, by extruding a polymer melt to form a hollow, cylindrical tube. Prior to insertion, the parison 50 may be heated to a temperature within the softening range of the material from which the parison 50 is made. The softening range includes a range of temperatures at which the material is readily formable. The mold may comprise a mold cavity 42. The mold may comprise mold halves 44, 46. The mold may comprise mold end features 64, 66, which may be blades, knives, or sharp edges used to cut or score a parison 50 or pipette 10. As illustrated in FIGS. 2a and 2c, the mold halves 44, 46 may close around the parison 50 rather than inserting the parison 50 into mold halves 44, 46 that are already closed. As illustrated in FIG. 2c, compressed air 100 may be introduced into the space 58, creating a differential pressure. The compressed air may be at a pressure of, for example, 0.05-1.5 MPa. As shown in FIG. 2d, the positive air pressure within the space 58 pushes the parison 50 into the mold cavity 42 to form a pipette 10 in the shape of the mold cavity 42. Forming the pipette 10 by blow molding may enhance the toughness of the pipette 10 due to biaxial expansion during the blow molding process. During molding, surface features such as volumetric markings 17 may be introduced to the surface of the pipette 10. These surface features may be created by several different techniques, either alone or in connection with each other. These techniques include printing or imprinting the mold cavity 42 to create mold surface features that corresponding pipette surface features during molding; or depositing ink on the surface of the mold cavity 42 that is then transferred to an outer surface of the pipette 10 during molding; or inserting a label into the mold cavity 42 that attaches to an outer surface of the pipette 10 during molding. Once the pipette 10 has cooled sufficiently, the mold 40 may be opened, for example by opening the mold halves 44, 46, and the pipette 10 may be ejected. Optionally, the mold halves 44, 46 may be opened in an arc shape. A new parison may then be inserted into the mold 40, and the process may be repeated.

Figure 3A:
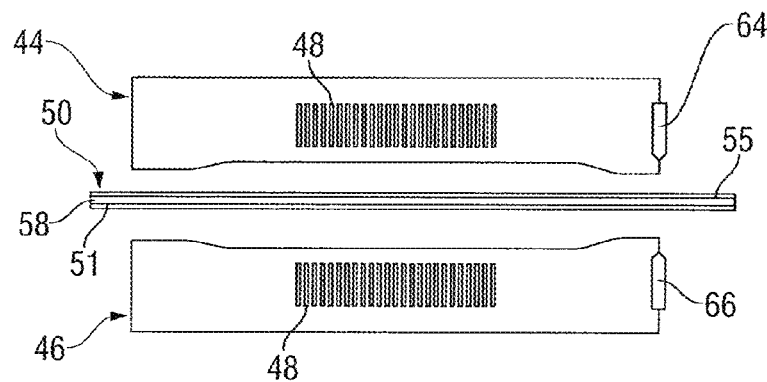
FIGS. 3a-3c illustrate an example method of forming a unitary serological pipette by vacuum forming according to the present disclosure.
Figure 3B:
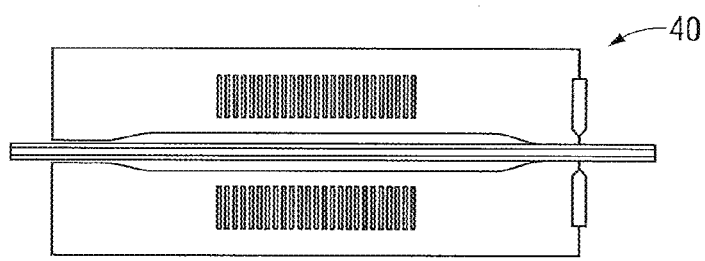
Figure 3C:
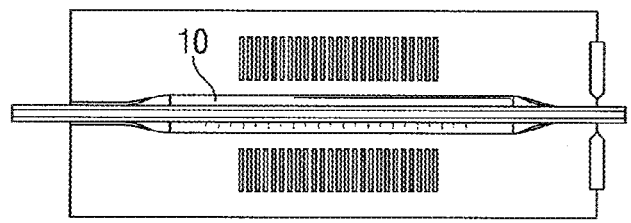

According to another aspect of the present disclosure, FIGS. 3a, 3b, and 3c illustrate an example method for producing a pipette 10 using vacuum forming. The vacuum forming process is similar to the blow molding process described above, except that the vacuum forming process relies on using a negative differential pressure outside a parison 50 instead of a positive differential pressure inside the parison 50. A parison 50 (or a tube or preform) may be inserted into a mold 40. Prior to insertion, the parison 50 may be heated to a temperature within the softening range of the material from which the parison 50 is made. As illustrated in FIGS. 3a and 3b, the mold halves 44, 46 may close around the parison 50. In contrast to the blow molding process, as illustrated in FIG. 3c, a negative air pressure may be introduced in the mold cavity 42 (outside the parison 50) by introducing a vacuum via vacuum cavities 48. The introduced vacuum may be at a pressure of, for example, 0.01 to 0.09 MPa. The negative air pressure in the mold cavity 42 draws the parison 50 into the shape of the mold cavity 42. Once the pipette 10 has cooled sufficiently, the mold 40 may be opened, for example by opening the mold halves 44, 46, and the pipette 10 may be ejected. A new parison may then be inserted into the mold 40, and the process may be repeated.

According to another aspect of the present disclosure, FIGS. 4a-4c illustrate a mold 40 comprising mold cavities 80, 82, 84 and in-score features 70, 71, 72, 73. As illustrated in FIG. 4a, a mold 40 may comprise one or more in-score features 70, 71, 72, 73, which may each act as an undercut. The in-score features 70, 71, 72, 73, are designed to score a pipette 10 in the mouth and tip regions 12, 16, to assist with forming a mouth 13 and tip 15. The in-score features 70, 71, 72, 73 may all be located within a single mold cavity 80 or may be located in separate, adjacent mold cavities 80, 82, 84 or even separate adjacent molds. As the different mold cavities 80, 82, 84 separate, the separating mold 40 applies a force on the in-score features 70, 71, 72, 73 causing excess pipette material to separate from the pipette. Optionally, a temperature differential between the different mold cavities 80, 82, 84 may beneficially increase stress at the in-score features 70, 71, 72, 73, leading to enhanced separation efficiency. The use of the in-score features 70, 71, 72, 73 can eliminate or reduce the need for post-molding cutting processes conducted outside of the mold.

According to another aspect of the present disclosure, FIGS. 5a-5e illustrate a mold 40 comprising mold cavities 80, 82, 84 and in-cut features 90, 91, 92, 93. As illustrated in FIG. 5a, the mold 40 may comprise one or more in-cut features 90, 91, 92, 93, which may each provide a sharp point. When a parison 50 is blow molded (or vacuum formed) into a pipette 10, the sharp point of the in-cut features 90, 91, 92, 93, may cause pipette material to thin sufficiently at or near to the in-cut features 90, 91, 92, 93 that the pipette 10 is separated from an adjacent pipette or adjacent pipette material, thus forming a mouth 13 and tip 15 in the pipette 10. The larger diameters of the mold cavities 80 and 84 at the site of the in-cut features 90, 91, 92, 93 may assist with thinning the pipette material, and thus with the cutting process. The in-cut features 90, 91, 92, 93 may all be located within a single mold cavity 80 or may be located in separate, adjacent mold cavities 80, 82, 84 or even separate adjacent molds. The use of the in-cut features 90, 91, 92, 93 can eliminate or reduce the need for post-molding cutting processes conducted outside of the mold.

According to another aspect of the present disclosure, FIGS. 6a-6e illustrate a mold 40 comprising mold cavities 80, 82, 84 and in-cut features 94, 95, 96, 97. As illustrated in FIG. 6a, the mold 40 may comprise one or more in-cut features 94, 95, 96, 97, which may each provide a sharp point. A parison 50 may be extruded into the mold cavities 80, 82, 84. The diameter of the parison 50 may be equal to the diameter of the pipette's outer mouth diameter, or inner tip diameter. The sharp point of the in-cut features 94, 95, 96, 97 may protrude from the mold halves 44, 46 so that when the mold 40 is closed, the parison 50 is cut at the location of the sharp point due to the interference contact between the in-cut features 94, 95, 96, 97 and the parison 50. The in-cut features 94, 95, 96, 97 may all be located within a single mold cavity 80 or may be located in separate, adjacent mold cavities 80, 82, 84 or even separate adjacent molds. The use of the in-cut features 94, 95, 96, 97 can eliminate or reduce the need for post-molding cutting processes conducted outside of the mold.

According to another aspect of the present disclosure, FIG. 7 illustrates a mold 40 comprising mold cavities 80, 82, 84 in which three pipettes 110, 111, 112 have been formed. The pipettes 110, 111, 112 may be drawn and separated in accordance with separation features as described in further detail below. As one example, the pipettes 110, 111, 112 may be cut by mold features 64, 66, which may be blades, knives, or sharp edges used to cut or score a parison 50 or pipette 112. As will be described with reference to FIGS. 10-13, other exemplary separation features may include separation cavities 184, 186 (illustrated in FIG. 10), pinch features 194, 196 (illustrated in FIGS. 11-12) or molds of a mold assembly having off-set centerlines (illustrated in FIG. 13).

Optionally, pipettes 110 and 111 may be arranged such that their tip regions are adjacent to each other. Optionally, pipettes 111 and 112 may be arranged such that their mouth regions are adjacent to each other. Arranging the pipettes tip-to-tip and mouth-to-mouth may enhance production efficiency and reduce production costs. For example, the amount of scrap pipette material generated may be reduced by arranging the pipettes tip-to-tip and mouth-to-mouth. As an alternative, pipettes 111 and 112 may be arranged such that the mouth region of a first of pipettes 111 and 112 is adjacent to the tip region of the other of pipettes 111 and 112. The large step change from the mouth thickness to the tip thickness provides a position in the mold 40 where force on the pipettes 111 and 112 facilitates separation and may lead to enhanced separation efficiency.

According to another aspect of the present disclosure, FIG. 8 illustrates a mold 40 comprising mold cavities 80, 82, 84, 86, 88 in which five pipettes 110, 111, 112, 113, 114 have been formed. The pipettes 110, 111, 112, 113, 114 may be drawn and cut by mold features 64, 66, which may be blades, knives, or sharp edges used to cut or score a parison 50 or pipette 113. For example, pipettes 112, 113 may be drawn to form tip regions in each pipette. If pipettes 112, 113 are drawn to form tip regions, the tip thicknesses will likely be smaller than described above (i.e., may be less than 0.4 mm). The pipettes 112, 113 may then be cut (e.g., using mold features 64, 66) to form tips in each pipette. Similarly, pipettes 113, 114 may be drawn to form mouth regions in each pipette. The pipettes 113, 114 may then be cut (e.g., using mold features 64, 66) to form mouths in each pipette. Optionally, a filter may be inserted into the mouth region of each of pipettes 113, 114. Forming the pipettes in a series or in an assembly line may enhance production speeds. For example, as many as 2,400 pipettes may be formed per minute in a mold 40 with four mold cavities. Optionally, the mold cavities may be arranged in a circular arrangement so that they are parallel along their longitudinal axes. Such a circular arrangement may provide additional advantages in terms of enhancing production speeds and efficiency.

Figure 9:
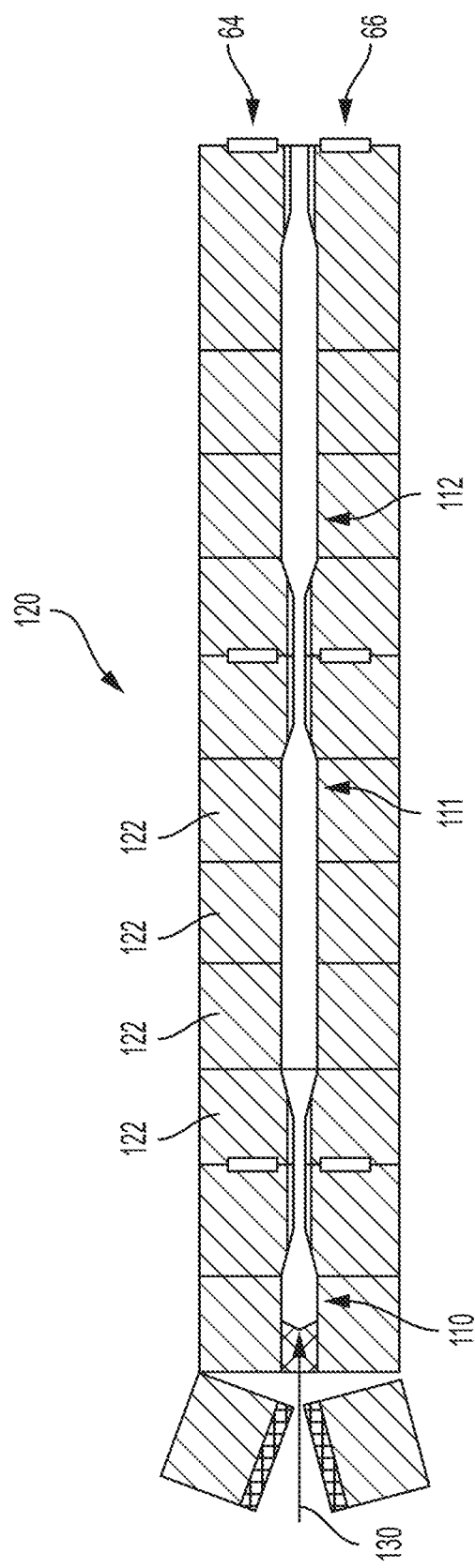
FIG. 9 illustrates an example of a series of serological pipettes being formed according to the present disclosure.

According to another aspect of the present disclosure, FIG. 9 illustrates a mold assembly 120 comprising a plurality of mold assembly segments 122. As an alternative to preforming a parison and inserting the parison into the mold, a polymer melt is extruded from extruder output 130 to form a parison or preform while contacting the parison or preform with the plurality of mold assembly segments 122 in succession. The mold assembly segments 122 include cavities when combined as the mold assembly 120 that are shaped to form the pipettes 110, 111, 112 in a plurality of portions the size of the mold assembly segments 122. The mold assembly segments 122 may have a length of between about 0.25 inches and about 14 inches. For example, the mold assembly segments 122 may have a length of between about 0.50 inches and about 10 inches, or between about 1.0 inches and about 7.0 inches or even between about 2.0 inches and about 4.0 inches. Compressed air may be applied intermittently or continuously into the mold assembly 120 to form pipettes 110, 111, 112 in the shape of the mold assembly 120. Alternatively, a negative air pressure may be intermittently or continuously introduced in the mold assembly 120 (outside the pipettes 110, 111, 112) by introducing a vacuum via vacuum cavities (not shown). Where compressed air or negative air pressure are continuously introduced, the mouth, body, and tip of the pipettes 110, 111, 112 may be formed by varying the speed in which the mold assembly segments 122 are contacted with the pipettes 110, 111, 112 and/or by varying the output speed of the extruder output 130. The pipettes 110, 111, 112 may be drawn and cut by mold features 64, 66, which may be blades, knives, or sharp edges used to cut or score the pipettes 110, 111, 112.

Aspects where a parison is not preformed may enhance production speeds. Radial witness lines may be formed from the mold assembly segments 122 and axial witness lines may be formed from the molds contacting the mold assembly 120 on a parting line. These witness lines could be surface features that may function as volumetric markings in various pipette applications.

Methods disclosed herein are described as including applying compressed air or negative air pressure to produce pipettes as described herein. However, it is also contemplated that aspects of the present disclosure may also apply material memory when forming the pipettes. Material memory, as used herein, is the propensity of materials, particularly plastics, to return to a previous shape or size upon the relief of internal stresses, produced, for example, by molecular orientation when blow molding an article from a preform. In certain aspects, material memory may be utilized to move, or may aid in moving, the parison 50 into the mold cavity 42, or the cavities of the mold assembly segments 122, to form a pipette. In pipettes having small thicknesses, material memory may be sufficient to move the parison 50 to form the shape of the pipette. However, in certain aspects material memory may be utilized in combination with applying compressed air or negative air pressure to form the shape of the pipette.

Aspects of the present disclosure further relate to methods and mold features which facilitate forming individual pipettes by separating a pipette from an adjacent pipette or adjacent pipette material. Separation features and separation methods will be described with reference to FIGS. 10-13 in which certain separation features are illustrated in either one or both of (a) molds in which a parison is preformed and inserted into the mold and formed using either a negative differential pressure outside a parison 50 or a positive differential pressure inside the parison 50, or (b) a plurality of mold assembly segments 122 in which a polymer melt is extruded from extruder output 130 to form a parison or preform while contacting the parison or preform with the plurality of mold assembly segments 122 in succession. Where the separation features are illustrated only in one of (a) or (b), it should be appreciated that each of the separation features and separation processes described herein may be included in the other of (a) or (b) in which the particular separation feature is not illustrated.

Figure 10:
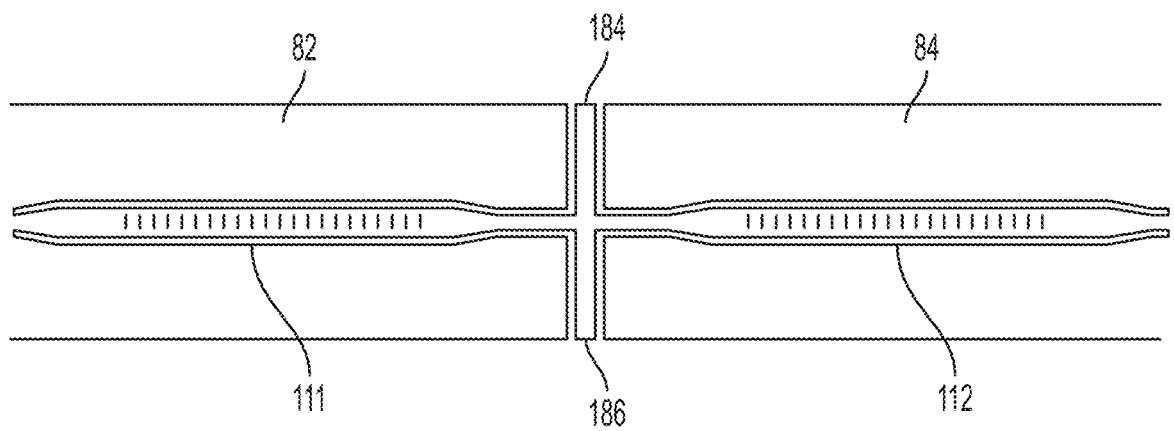
FIG. 10 illustrates an example mold comprising a separation cavity according to the present disclosure.

According to another aspect of the present disclosure, FIG. 10 illustrates an example mold comprising a separation cavity according to the present disclosure. As shown, an area between adjacent mold cavities 82, 84 may include at least one separation cavity 184, 186. As the different mold cavities 82, 84 separate, the pipette material expands into the at least one separation cavity 184, 186 and the thickness of the pipette material decreases within the at least one separation cavity 184, 186. Such a decrease in thickness of the pipette material in turn causes the material to split, thus providing a point at which the adjacent pipette material is separated in-mold and individual pipettes 111, 112 are formed. Preferably, the pipettes 111, 112 are separated in-mold. However, in the alternative, the at least one separation cavity 184, 186 may provide a relatively weak area between the pipettes 111, 112 where the pipettes 111, 112 can be easily separated after they are removed from the mold. As described above, the pipettes 111, 112 may be arranged tip-to-tip, mouth-to-mouth or such that the mouth region of a first of pipettes 111 and 112 is adjacent to the tip region of the other of pipettes 111 and 112.

The at least one separation cavity 184, 186 as shown in FIG. 10 is illustrated as having an opening in communication with mold cavities 42 and equal length walls extending from the opening parallel to one another. However, the at least one separation cavity 184, 186 as described herein is not limited to such a shape and may be any shape which forms a cavity in communication with the mold cavities 42. For example, the walls of the at least one separation cavity 184, 186 may extend from the opening to form a round or oval cavity. As another example, the walls of the at least one separation cavity 184, 186 may extend from the opening at an oblique angle.

Figure 11:
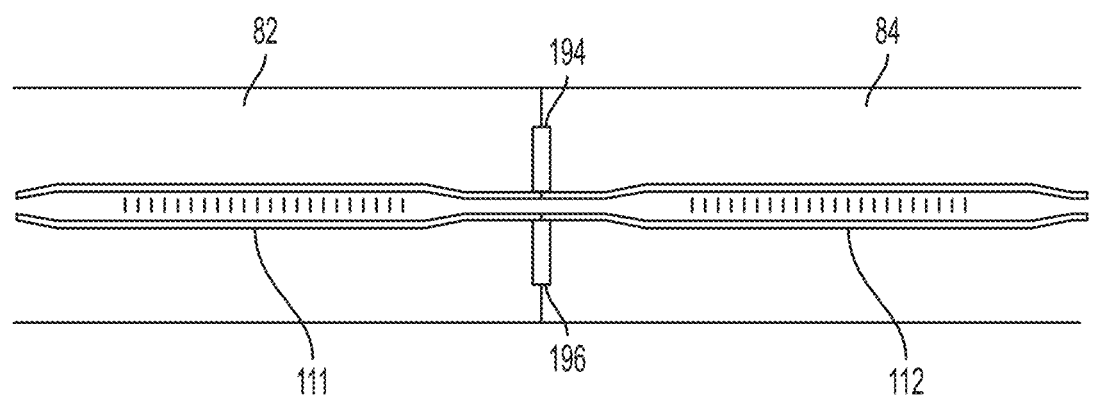
FIG. 11 illustrates an example mold comprising a mold pinch feature according to the present disclosure.
Figure 12:
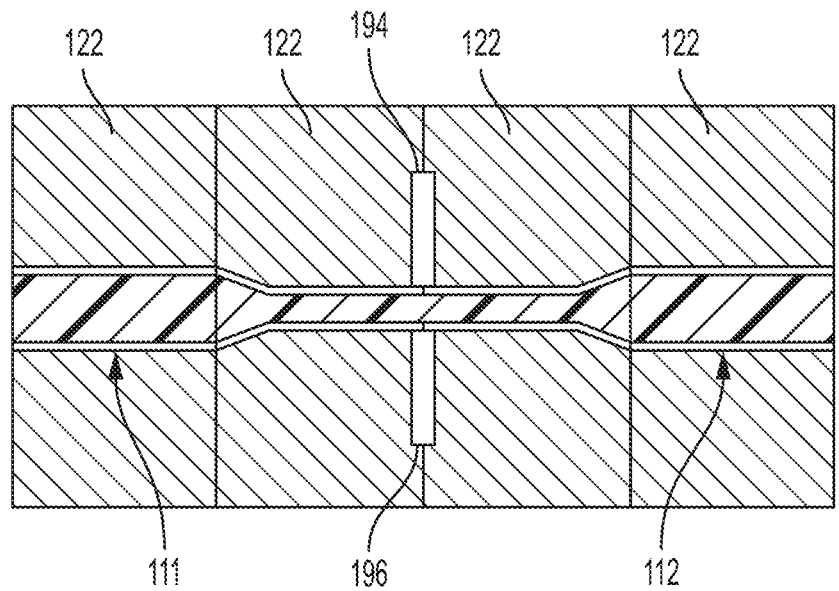
FIG. 12 illustrates an example mold assembly comprising a mold pinch feature according to the present disclosure.

According to another aspect of the present disclosure, FIG. 11 illustrates an example mold comprising a mold pinch feature according to the present disclosure. According to another aspect of the present disclosure, FIG. 12 illustrates an example mold assembly comprising a mold pinch feature according to the present disclosure. As shown in FIG. 11, an area between adjacent mold cavities 82, 84 may include at least two opposing pinch features 194, 196, or, as shown in FIG. 12, at least one of the mold assembly segments 122 may include at least two opposing pinch features 194, 196. As opposed to mold end features 64, 66, which may be blades, knives, or sharp edges, the at least two opposing pinch features 194, 196 comprise flat surfaces which, as the mold halves 44, 46 close around the parison 50, or as polymer is extruded into the cavities of the mold assembly segments 122, come together to form a pinching location. The pinching location between the at least two opposing pinch features 194, 196 forms an area of decreased pipette material thickness. Such decreased thickness of the pipette material in turn causes the material to split, thus providing a point at which the adjacent pipette material is separated in-mold and individual pipettes 111, 112 are formed. Preferably, the pipettes 111, 112 are separated in-mold. However, in the alternative, the pinching location between the at least two opposing pinch features 194, 196 may provide a relatively weak area between the pipettes 111, 112 where the pipettes 111, 112 can be easily separated after they are removed from the mold.

The at least two opposing pinch features 194, 196 may be configured such that the pinch features 194, 196 are not stationary. For example, the at least two opposing pinch features 194, 196 may be configured to move within the mold cavities 82, 84, or within the cavities of the mold assembly segments 122, such that the flat surface of a first of the pinch features 194 moves towards the flat surface of a second of the pinch features 196 to apply pressure on the pipette material at the pinching location. Such pressure may facilitate forming a point at which the adjacent pipette material is separated in-mold and individual pipettes 111, 112 are formed.

Alternatively, a pinching location may be formed within the mold cavities 82, 84, or within the cavities of the mold assembly segments 122, without the at least two opposing pinch features 194, 196. Within mold cavities 82, 84, an area between the pipettes 111, 112 may include a narrow passage in which an area of decreased pipette material thickness is formed. Such decreased thickness of the pipette material in turn causes the material to split, thus providing a point at which the adjacent pipette material is separated in-mold and individual pipettes 111, 112 are formed. Similarly, some of the cavities of the mold assembly segments 122 may include a narrow passage in which an area of decreased pipette material thickness is formed. Such area of decreased pipette material thickness may cause the material to split. However, in a mold assembly 120 such as is shown in FIG. 9, insertion of subsequent mold assembly segments 122 may apply pressure on the pipette material within the narrow passage. Such pressure may facilitate forming a point at which the adjacent pipette material is separated in-mold and individual pipettes 111, 112 are formed.

Figure 13:
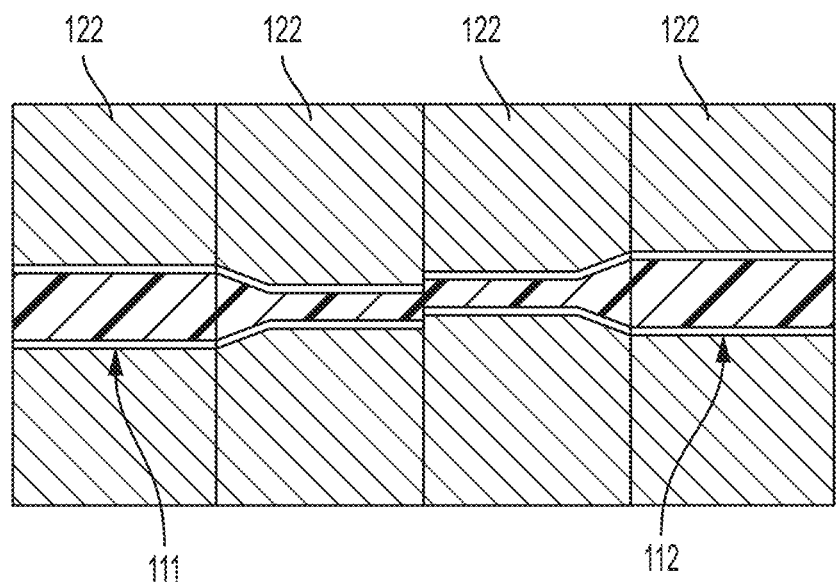
FIG. 13 illustrates an example mold assembly comprising adjacent molds having off-set centerlines according to the present disclosure.

FIG. 13 illustrates an example mold assembly comprising adjacent molds having off-set centerlines according to the present disclosure. As shown, the offset centerlines of adjacent mold assembly segments 122 forms an interface between the adjacent mold assembly segments 122 where pipette material is sheared, thus providing a point at which the adjacent pipette material is separated in-mold and individual pipettes 111, 112 are formed. Preferably, the pipettes 111, 112 are separated in-mold. However, in the interface between the adjacent mold assembly segments 122 may form a step between the pipettes 111, 112 where the pipettes 111, 112 can be easily separated after they are removed from the mold. As described above, the pipettes 111, 112 may be arranged tip-to-tip, mouth-to-mouth or such that the mouth region of a first of pipettes 111 and 112 is adjacent to the tip region of the other of pipettes 111 and 112.

According to another aspect of the present disclosure, the temperature conditions within the mold cavities 82, 84 or within the mold assembly segments 122, may be controlled to facilitate separating a pipette from an adjacent pipette or adjacent pipette material. As one example, the areas between the pipettes may be locally cooled relative to the other areas of the mold cavities 82, 84 or the cavities of the mold assembly segments 122, to facilitate separation of the pipette from an adjacent pipette or adjacent pipette material. As another example, the areas between the pipettes may be locally heated relative to the other areas of the mold cavities 82, 84 or the cavities of the mold assembly segments 122, to facilitate shrinking of the pipette material and separation of the pipette from an adjacent pipette or adjacent pipette material. Temperature conditions as described above may be created by locally controlling the temperature of the air or the temperature of the construction materials of the mold cavity/mold assembly segment material in the areas between the pipettes.

Examples 10 ml and 25 ml pipettes were made according to the methods shown in FIG. 7, blow molding to form a unitary pipette. A cold preform was inserted into a blow mold and pressurized (10 psi to 20 psi) then heated with radiant heat from the mold. The process took approximately 40 minutes for the molds to heat, the form to expand and the mold to cool down. Parts were removed and measured.

Table 2 shows inner diameter (ID), outer diameter (OD) and thickness measurements (in mm) of the tip portion, the body portion and the mouth portion of these experimental pipettes.

TABLE 2

| Pipette Volume | Tip OD | Tip ID | Tip Thickness | Body ID | Body OD | Body Thickness | Mouth ID | Mouth OD | Mouth thickness |
|---|---|---|---|---|---|---|---|---|---|
| 10 mL | 4.57 | 2.95 | 0.81 | 7.92 | 8.66 | 0.37 | 6.77 | 7.62 | 0.42 |
| 25 mL | 6.48 | 4.06 | 1.21 | 12.70 | 13.66 | 0.48 | 5.71 | 7.62 | 0.95 |

As can be seen from Table 2, the tip thickness and the mouth thickness are greater than the body thickness of experimental pipettes made by blow molding. These measurements were consistent with thicknesses predicted using modeling.

Table 3 shows predicted measurements using modeling of blow molding (according to the methods shown in FIG. 7). Calculated final dimensions were based on balancing the material in the preform to the final targeted part diameter and then solving for thickness.

TABLE 3

| Pipette Volume | Tip OD | Tip ID | Tip Thickness | Body ID | Body OD | Body Thickness | Mouth ID | Mouth OD | Mouth thickness |
|---|---|---|---|---|---|---|---|---|---|
| 1 mL | 3.56 | 2.03 | 0.76 | 2.95 | 4.14 | 0.61 | 2.95 | 4.14 | 0.61 |
| 2 mL | 3.56 | 2.03 | 0.76 | 4.06 | 5.00 | 0.46 | 4.06 | 5.00 | 0.46 |
| 5 mL | 3.51 | 1.57 | 0.97 | 5.97 | 6.74 | 0.39 | 6.95 | 6.73 | 0.34 |
| 10 mL | 3.51 | 1.57 | 0.97 | 7.92 | 8.52 | 0.30 | 6.95 | 7.62 | 0.34 |
| 25 mL | 5.21 | 2.24 | 1.49 | 12.70 | 13.54 | 0.42 | 6.00 | 7.62 | 0.81 |
| 50 mL | 5.21 | 3.05 | 1.08 | 15.88 | 16.43 | 0.28 | 6.34 | 7.62 | 0.64 |
| 100 mL | 6.35 | 3.18 | 1.59 | 22.35 | 23.02 | 0.33 | 5.27 | 7.62 | 1.17 |

Table 3 illustrates that, using modeled data, pipettes formed by the methods shown in FIG. 7 and FIG. 8 will result in pipettes having thicker tip and/or mouth regions compared to the body thickness. In some embodiments, only one of the tip or the mouth is thicker than the body thickness.

These data are exemplary. Molding conditions can be adjusted, or a profiled or shaped parison can be used to modulate thicknesses at the tip or the mouth.

Table 4 shows blow molding followed by a draw of the tip portion (according to the methods shown in FIG. 8) techniques. Using this technique, with a tip draw following formation of the pipette by blow molding or vacuum molding, the tip thickness may be any thickness, depending on the extent to which the tip is drawn following forming of the pipette.

TABLE 4

| Pipette Volume | Tip OD | Tip ID | Tip Thickness | Body ID | Body OD | Body Thickness | Mouth ID | Mouth OD | Mouth thickness |
|---|---|---|---|---|---|---|---|---|---|
| 5 mL | 2.50 | 1.80 | 0.35 | 7.40 | 8.00 | 0.29 | 7.42 | 8.00 | 0.29 |
| 10 mL | 3.43 | 1.52 | 0.95 | 7.92 | 9.02 | 0.56 | 6.73 | 8.00 | 0.64 |

Table 5 illustrates measurements taken from prior art examples of pipettes (in mm) (Costar and ALP brand pipettes) made by traditional means. The first column shows unitary pipettes made by drawing. The second column shows pipettes made by drawing a body, and then attaching a tip or, in examples, a tip and a mouth may be attached in a separate manufacturing step. Table 5 shows that, in the prior art examples measured, body thickness was generally greater than or equal to the mouth thickness. While the mouth thickness of the assembled pipettes may be thicker than the thickness of the body, these pipettes are assembled by drawing a pipette body and then attaching a mouth part to the pipette body. There will always be a seam or a mismatch or a step or a bump or a ridge in the internal or external surface of the pipette where this connection is made. In addition, there may be residue or particulate created during the assembly process (ultrasonic welding, for example) which may create unwanted contaminants inside the pipette. For smaller pipettes, the 1 ml and 2 ml pipettes, it is not practical to assemble pipettes by adding a mouth or a tip (*). These pipettes are too small. For the larger pipettes, it is not practical to draw pipettes. These traditionally require assembly (**)

and wherein the inner curved surface is substantially smooth in the transition regions between the tip region and the body region or between the body region and the mouth region.

According to another aspect (2) of the present disclosure, the pipette of aspect (1) is provided, wherein the body thickness is less than the tip thickness.

According to another aspect (3) of the present disclosure, the pipette of aspect (1) is provided, wherein the body thickness is less than the mouth thickness.

According to another aspect (4) of the present disclosure, the pipette of aspect (1) is provided, wherein the inner curved surface is substantially smooth along the length of the pipette.

According to another aspect (5) of the present disclosure, the pipette of any of aspects (1)-(4) is provided, wherein the tip thickness is 0.3 mm or greater.

According to another aspect (6) of the present disclosure, the pipette of any of aspects (1)-(4) is provided, wherein the tip thickness is 0.6 mm or greater.

According to another aspect (7) of the present disclosure, the pipette of any of aspects (1)-(6) is provided, wherein the body thickness is 0.6 mm or less.

According to another aspect (8) of the present disclosure, the pipette of any of aspects (1)-(6) is provided, wherein the body thickness is 0.4 mm or less.

According to another aspect (9) of the present disclosure, the pipette of any of aspects (1)-(8) is provided, wherein the mouth thickness is 0.3 mm or greater.

According to another aspect (10) of the present disclosure, the pipette of aspect (9) is provided, wherein the mouth thickness is 0.6 mm or greater.

TABLE 5

| Pipette Volume | Tip Thickness Unitary Pipette Prior Art (drawn) (mm) | Tip Thickness Assembled Pipette Prior Art (mm) | Body Thickness Unitary Pipette Prior Art (drawn) (mm) | Body Thickness Assembled Pipette Prior Art (mm) | Mouth thickness Prior Art (mm) |
|---|---|---|---|---|---|
| 1 mL | 0.50 | NA* | 0.81 | NA | 0.81 |
| 2 mL | 0.75 | NA* | 1.21 | NA | 1.21 |
| 5 mL | 0.30 | NA* | 1.02 | 1.02 | 1.02 |
| 10 mL | 0.33 | 0.90 | 1.30 | 0.80 | 1.02 |
| 25 mL | 0.38 | 1.50 | 1.70 | 0.81 | 1.02 |
| 50 mL | NA** | 1.10 | NA** | 1.02 | 1.02 |
| 100 mL | NA** | 1.60 | NA** | 1.02 | 1.02 |

According to an aspect (1) of the present disclosure, a pipette is provided. The pipette comprises: a length, a longitudinal axis, and an inner curved surface enclosing a space; a tip region having a tip diameter and a tip thickness, wherein the tip region is connected to a body region having a body diameter and a body thickness, wherein the body diameter is greater than the tip diameter, and wherein the body region is connected to a mouth region having a mouth diameter and a mouth thickness, wherein the body thickness is less than one of the tip thickness or the mouth thickness, According to another aspect (11) of the present disclosure, a method for producing a pipette is provided. The method comprises the steps of: (a) providing a parison or preform, the parison or preform having a longitudinal axis and an inner curved surface enclosing a space; (b) inserting the parison or preform into a mold, the mold having a mold cavity and proximal and distal mold end features; and (c) blow-molding or vacuum forming the parison or preform to form a pipette in the shape of the mold, the pipette having proximal and distal ends.

According to another aspect (12) of the present disclosure, the method of aspect (11) is provided, wherein step (c) involves blow-molding the parison or preform.

According to another aspect (13) of the present disclosure, the method of aspect (11) is provided, wherein step (c) involves vacuum forming the parison or preform.

According to another aspect (14) of the present disclosure, the method of any of aspects (11)-(13) is provided, wherein the proximal and distal mold end features are orifices.

According to another aspect (15) of the present disclosure, the method of any of aspects (11)-(14) is provided, further comprising a step prior to step (b) of printing the mold cavity to create mold surface features, wherein during step (c) pipette surface features are formed on the pipette corresponding to the mold surface features.

According to another aspect (16) of the present disclosure, the method of any of aspects (11)-(15) is provided, further comprising a step prior to step (b) of depositing ink on a surface of the mold cavity, wherein during step (c) the ink is transferred to a surface of the pipette.

According to another aspect (17) of the present disclosure, the method of any of aspects (11)-(16) is provided, further comprising a step prior to step (b) of inserting a label into the mold cavity, wherein during step (c) the label attaches to the pipette.

According to another aspect (18) of the present disclosure, the method of any of aspects (11)-(17) is provided, further comprising a step subsequent to step (c) of drawing the distal end to form a pipette tip.

According to another aspect (19) of the present disclosure, the method of any of aspects (11)-(18) is provided, wherein the mold cavity comprises a cutting or scoring feature configured to cut or score the pipette during or after step (c).

According to another aspect (20) of the present disclosure, the method of any of aspects (11)-(19) is provided, further comprising a step subsequent to step (c) of cutting or scoring the pipette at its distal end to form or prepare to form a distal aperture.

According to another aspect (21) of the present disclosure, the method of any of aspects (11)-(20) is provided, further comprising a step subsequent to step (c) of cutting or scoring the pipette at its proximal end to form or prepare to form a proximal aperture.

According to another aspect (22) of the present disclosure, the method of aspect (21) is provided, further comprising a step of inserting a filter into the formed proximal aperture of the pipette.

According to another aspect (23) of the present disclosure, a method for producing pipettes is provided. The method comprises the steps of: (a) providing a parison or preform, the parison or preform having a longitudinal axis and an inner curved surface enclosing a space; (b) inserting the parison or preform into a mold, the mold having at least two mold cavities, wherein each mold cavity has proximal and distal mold end features; and (c) blow-molding or vacuum forming the parison or preform to form at least two pipettes in the shape of the at least two mold cavities, each of the at least two pipettes having proximal and distal ends.

According to another aspect (24) of the present disclosure, the method of aspect (23) is provided, wherein step (c) involves blow-molding the parison or preform.

According to another aspect (25) of the present disclosure, the method of aspect (23) is provided, wherein step (c) involves vacuum forming the parison or preform.

According to another aspect (26) of the present disclosure, the method of any of aspects (23)-(25) is provided, wherein the proximal and distal mold end features are orifices.

According to another aspect (27) of the present disclosure, the method of any of aspects (23)-(26) is provided, wherein the at least two pipettes are arranged in the at least two mold cavities such that the proximal ends of at least two pipette are in close proximity to each other.

According to another aspect (28) of the present disclosure, the method of any of aspects (23)-(27) is provided, wherein the at least two pipettes are arranged in the at least two mold cavities such that the distal ends of at least two pipette are in close proximity to each other.

According to another aspect (29) of the present disclosure, the method of any of aspects (23)-(28) is provided, further comprising a step prior to step (b) of printing the at least two mold cavities to create mold surface features, wherein during step (c) pipette surface features are formed on the at least two pipettes corresponding to the mold surface features.

According to another aspect (30) of the present disclosure, the method of any of aspects (23)-(29) is provided, further comprising a step prior to step (b) of depositing ink on a surface of the at least two mold cavities, wherein during step (c) the ink is transferred to a surface of the at least two pipettes.

According to another aspect (31) of the present disclosure, the method of any of aspects (23)-(30) is provided, further comprising a step prior to step (b) of inserting a label into each of the at least two mold cavities, wherein during step (c) a label attaches to each of the at least two pipettes.

According to another aspect (32) of the present disclosure, the method of any of aspects (23)-(31) is provided, further comprising a step subsequent to step (c) of drawing the distal end of at least one of the at least two pipettes to form a pipette tip in the at least one of the at least two pipettes.

According to another aspect (33) of the present disclosure, the method of aspect (32) is provided, wherein the drawing forms a pipette tip in each of the at least two pipettes.

According to another aspect (34) of the present disclosure, the method of any of aspects (32)-(33) is provided, wherein the drawing to form the pipette tip is achieved by moving at least two of the at least two mold cavities away and apart from each other.

According to another aspect (35) of the present disclosure, the method of any of aspects (23)-(34) is provided, wherein the at least two mold cavities comprise a cutting or scoring feature configured to cut or score the at least two pipettes during or after step (c).

According to another aspect (36) of the present disclosure, the method of any of aspects (23)-(35) is provided, further comprising a step subsequent to step (c) of cutting or scoring at least one of the at least two pipettes at its distal end to form or prepare to form a distal aperture.

According to another aspect (37) of the present disclosure, the method of any of aspects (23)-(36) is provided, further comprising a step subsequent to step (c) of cutting or scoring at least one of the at least two pipettes at its proximal end to form or prepare to form a proximal aperture.

According to another aspect (38) of the present disclosure, the method of aspect (37) is provided, further comprising a step of inserting a filter into the proximal aperture of at least one of the at least two pipettes.

According to another aspect (39) of the present disclosure, the method of any of aspects (23)-(38) is provided, wherein the mold further comprises at least one separation cavity between the at least two mold cavities, and wherein the method further comprises a step subsequent to step (c) of separating the at least two pipettes by blow-molding or vacuum forming a portion of the parison or preform into the at least one separation cavity.

According to another aspect (40) of the present disclosure, the method of aspect (39) is provided, wherein the at least one separation cavity comprises an opening in communication with the at least two mold cavities and wherein the at least one separation cavity further comprises walls extending from the opening parallel to one another.

According to another aspect (41) of the present disclosure, the method of aspect (39) is provided, wherein the at least one separation cavity comprises an opening in communication with the at least two mold cavities and wherein the at least one separation cavity further comprises walls extending from the opening at an oblique angle.

According to another aspect (42) of the present disclosure, the method of aspect (39) is provided, wherein the at least one separation cavity comprises a round shape.

According to another aspect (43) of the present disclosure, the method of any of aspects (23)-(38) is provided, wherein the mold further comprises at least two opposing pinch features between the at least two mold cavities, and wherein the method further comprises a step subsequent to step (c) of separating the at least two pipettes by forming a pinching location in a portion of the parison or preform.

According to another aspect (44) of the present disclosure, the method of aspect (43) is provided, wherein the at least two opposing pinch features comprises flat surfaces.

According to another aspect (45) of the present disclosure, the method of aspect (43) is provided, wherein the at least two opposing pinch features are configured to move within the at least two mold cavities, and wherein forming a pinching location in a portion of the parison or preform comprises moving the at least two opposing pinch features to apply a pressure to the portion of the parison or preform.

According to another aspect (46) of the present disclosure, the method of any of aspects (23)-(38) is provided, wherein the mold further comprises a narrow passage between the at least two mold cavities, and wherein the method further comprises a step subsequent to step (c) of separating the at least two pipettes by blow-molding or vacuum forming a portion of the parison or preform into the narrow passage.

According to another aspect (47) of the present disclosure, the method of aspect (41) is provided, wherein blow-molding or vacuum forming a portion of the parison or preform into the narrow passage forms a pinching location in a portion of the parison or preform.

According to another aspect (48) of the present disclosure, the method of any of aspects (23)-(38) is provided, wherein the at least two mold cavities are configured such that the centerline of a first of the at least two mold cavities is offset from the centerline of a second of the at least two mold cavities, and wherein the method further comprises a step subsequent to step (c) of separating the at least two pipettes by blow-molding or vacuum forming a portion of the parison or preform within the at least two mold cavities.

According to another aspect (49) of the present disclosure, a method for producing pipettes is provided. The method comprises: (a) extruding a polymer melt into at least one mold segment of a mold assembly having a plurality of mold segments to form a parison or preform, wherein the plurality of mold segments comprise cavities shaped to form pipettes; and (b) blow-molding or vacuum forming the parison or preform to form at least two pipettes in the shape of the mold segment cavities, each of the at least two pipettes having proximal and distal ends.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

The invention claimed is:

1. A method for producing pipettes comprising the steps of:
   (a) providing a parison or preform, the parison or preform having a longitudinal axis and an inner curved surface enclosing a space;
   (b) inserting the parison or preform into a mold, the mold having at least two mold cavities, wherein each mold cavity has proximal and distal mold end features and the at least two mold cavities being in fluid communication with each other; and
   (c) blow-molding or vacuum forming the parison or preform to form at least two pipettes in the shape of the at least two mold cavities, each of the at least two pipettes having proximal and distal ends,
   wherein the at least two mold cavities are arranged end-to-end in the mold with one of the proximal and distal ends of one of the at least two mold cavities abutting one of the proximal and distal ends of another of the at least two mold cavities.

2. The method of claim 1, wherein step (c) involves blow-molding the parison or preform.

3. The method of claim 1, wherein step (c) involves vacuum forming the parison or preform.

4. The method of claim 1, wherein the proximal and distal mold end features are orifices.

5. The method of claim 1, wherein the at least two pipettes are arranged in the at least two mold cavities such that the proximal ends of the at least two pipettes are adjacent to each other.

6. The method of claim 1, wherein the at least two pipettes are arranged in the at least two mold cavities such that the distal ends of at the least two pipettes are adjacent to each other.

7. The method of claim 1, further comprising a step prior to step (b) of printing the at least two mold cavities to create mold surface features, wherein during step (c) pipette surface features are formed on the at least two pipettes corresponding to the mold surface features.

8. The method of claim 1, further comprising a step prior to step (b) of depositing ink on a surface of the at least two mold cavities, wherein during step (c) the ink is transferred to a surface of the at least two pipettes.

9. The method of claim 1, further comprising a step prior to step (b) of inserting a label into each of the at least two mold cavities, wherein during step (c) a label attaches to each of the at least two pipettes.

10. The method of claim 1, further comprising a step subsequent to step (c) of drawing the distal end of at least one of the at least two pipettes to form a pipette tip in the at least one of the at least two pipettes.

11. The method of claim 10, wherein the drawing forms a pipette tip in each of the at least two pipettes.

12. The method of claim 10, wherein the drawing to form the pipette tip is achieved by moving at least two of the at least two mold cavities away and apart from each other.

13. The method of claim 1, wherein the at least two mold cavities comprise a cutting or scoring feature configured to cut or score the at least two pipettes during or after step (c).

14. The method of claim 1, further comprising a step subsequent to step (c) of cutting or scoring at least one of the at least two pipettes at its distal end to form or prepare to form a distal aperture.

15. The method of claim 1, further comprising a step subsequent to step (c) of cutting or scoring at least one of the at least two pipettes at its proximal end to form or prepare to form a proximal aperture.

16. The method of claim 15, further comprising a step of inserting a filter into the proximal aperture of at least one of the at least two pipettes.

17. The method of claim 1, wherein the mold further comprises at least one separation cavity between the at least two mold cavities.

18. The method of claim 17, wherein the at least one separation cavity comprises an opening in communication with the at least two mold cavities and wherein the at least one separation cavity further comprises walls extending from the opening parallel to one another.

19. The method of claim 17, wherein the at least one separation cavity comprises an opening in communication with the at least two mold cavities and wherein the at least one separation cavity further comprises walls extending from the opening at an oblique angle.

20. The method of claim 17, wherein the at least one separation cavity comprises a round shape.

21. The method of claim 1, wherein the mold further comprises at least two opposing pinch features between the at least two mold cavities, and wherein the method further comprises a step subsequent to step (c) of separating the at least two pipettes by forming a pinching location in a portion of the parison or preform.

22. The method of claim 21, wherein the at least two opposing pinch features comprises flat surfaces.

23. The method of claim 21, wherein the at least two opposing pinch features are configured to move within the at least two mold cavities, and wherein forming a pinching location in a portion of the parison or preform comprises moving the at least two opposing pinch features to apply a pressure to the portion of the parison or preform.

24. The method of claim 1, wherein the mold further comprises a mold pinch feature between the at least two mold cavities, wherein the mold pinch feature forms a pinching location for forming an area of decreased pipette material thickness where the at least two pipettes are to be separated.

25. The method of claim 1, wherein the at least two mold cavities are configured such that the centerline of a first of the at least two mold cavities is offset from the centerline of a second of the at least two mold cavities.

26. The method of claim 1, wherein the inserting the parison or preform into the mold comprises extruding a polymer melt into the mold.

* * * * *

UNITED STATES PATENT AND TRADEMARK OFFICE
CERTIFICATE OF CORRECTION

PATENT NO. : 11,065,612 B2  
APPLICATION NO. : 15/986323  
DATED : July 20, 2021  
INVENTOR(S) : John Claude Cadotte, Jr. et al.

Page 1 of 1

It is certified that error appears in the above-identified patent and that said Letters Patent is hereby corrected as shown below:

In the Claims

In Column 18, Line 44, Claim 6, delete "of at the least" and insert -- of the at least --, therefor.

Signed and Sealed this  
Seventh Day of January, 2025

Derrick Brent  
*Acting Director of the United States Patent and Trademark Office*